US012163375B2

(12) United States Patent
Watkins et al.

(10) Patent No.: US 12,163,375 B2

(45) Date of Patent: Dec. 10, 2024

(54) BOTTOM RAIL FOR DOUBLE PANEL WINDOW SHADING AND METHOD TO OPERATE SAME

(71) Applicant: HUNTER DOUGLAS INC., Pearl River, NY (US)

(72) Inventors: Richard D. Watkins, Lake Luzerne, NY (US); Thomas Marusak, Loudonville, NY (US)

(73) Assignee: COMFORTEX CORPORATION, Maplewood, NY (US)

(*) Notice: Subject to any disclaimer, the term of this patent is extended or adjusted under 35 U.S.C. 154(b) by 643 days.

(21) Appl. No.: 17/426,854

(22) PCT Filed: Mar. 4, 2020

(86) PCT No.: PCT/US2020/020916

§ 371 (c)(1),
(2) Date: Jul. 29, 2021

(87) PCT Pub. No.: WO2020/180943

PCT Pub. Date: Sep. 10, 2020

(65) Prior Publication Data

US 2022/0112764 A1 Apr. 14, 2022

Related U.S. Application Data

(60) Provisional application No. 62/814,806, filed on Mar. 6, 2019.

(51) Int. Cl.

| | |
|---|---|
| ***E06B 9/388*** | (2006.01) |
| ***E06B 9/262*** | (2006.01) |
| ***E06B 9/34*** | (2006.01) |

(52) U.S. Cl.

CPC .............. *E06B 9/388* (2013.01); *E06B 9/262* (2013.01); *E06B 9/34* (2013.01); *E06B 2009/2627* (2013.01)

(58) Field of Classification Search

CPC ..... E06B 2009/2447; E06B 2009/2458; E06B 2009/2452; E06B 2009/2435; E06B 9/388; E06B 9/262; E06B 9/34; E06B 2009/2627

See application file for complete search history.

(56) References Cited

U.S. PATENT DOCUMENTS

| | | |
|---|---|---|
| 5,099,906 A | 3/1992 | Chigusa et al. |
| 5,285,838 A | 2/1994 | Rapp et al. |

(Continued)

FOREIGN PATENT DOCUMENTS

| | | |
|---|---|---|
| EP | 2733302 A2 | 5/2014 |
| JP | S-64-46397 U * | 3/1989 |

(Continued)

OTHER PUBLICATIONS

PCT International Preliminary Report on Patentability for related PCT Application No. PCT/US2014/052655 dated Dec. 17, 2015, 5 pages.

(Continued)

*Primary Examiner* — Abe Massad

(74) *Attorney, Agent, or Firm* — Hoffman Warnick LLC

(57) ABSTRACT

Aspects of the present disclosure include a bottom rail for a double panel window shading having opposing first and second panels coupled by a plurality of vanes. The bottom rail may include a body, a first connection point on the body coupled to the first panel, and a second connection point on the body coupled to the second panel. A weight distribution of the body may cause a center of gravity of the bottom rail to be on a side of a plane through the first connection point and the second connection point opposing the body. The bottom rail is adjustable between an open position in which the first and second connection points exert downward tensile force on the respective panels, and a closed position in which the first connection point solely exerts downward (Continued)

tensile force on the first panel without the second connection point exerting downward tensile force on the second panel.

13 Claims, 9 Drawing Sheets

(56) References Cited

U.S. PATENT DOCUMENTS

| | | | | |
|---|---|---|---|---|
| 5,419,385 | A | 5/1995 | Vogel et al. | |
| 5,855,235 | A | 1/1999 | Colson et al. | |
| 6,105,652 | A | 8/2000 | Judkins | |
| 6,116,325 | A | 9/2000 | Colson et al. | |
| 6,237,667 | B1 * | 5/2001 | Fraczek | E06B 9/46 160/84.05 |
| 6,435,252 | B2 | 8/2002 | Colson et al. | |
| 6,529,323 | B2 | 3/2003 | Okumura | |
| 7,128,121 | B2 | 10/2006 | Nien | |
| 7,267,156 | B2 | 9/2007 | Byeon | |
| 7,311,131 | B2 | 12/2007 | Nien et al. | |
| 7,438,115 | B2 | 10/2008 | Bohlen | |
| 7,520,310 | B2 | 4/2009 | Colosio | |
| 8,281,846 | B2 | 10/2012 | Zhu | |
| 8,327,906 | B2 | 12/2012 | Kwak | |
| 8,356,653 | B2 | 1/2013 | Fu-Lai et al. | |
| 8,517,081 | B2 | 8/2013 | Huang | |
| 8,556,204 | B2 | 10/2013 | Kao | |
| 8,763,674 | B2 | 7/2014 | Kataoka et al. | |
| 10,604,996 | B2 * | 3/2020 | Colson | E06B 9/262 |
| 11,125,010 | B2 * | 9/2021 | Kwon | E06B 9/34 |
| 2002/0059987 | A1 | 5/2002 | Coleman et al. | |
| 2004/0226663 | A1 | 11/2004 | Smith et al. | |
| 2007/0175596 | A1 | 8/2007 | Chien | |
| 2011/0126959 | A1 * | 6/2011 | Holt | E06B 9/34 156/65 |
| 2012/0298318 | A1 | 11/2012 | Wolek | |
| 2014/0138037 | A1 | 5/2014 | Colson et al. | |
| 2014/0216666 | A1 | 8/2014 | Smith et al. | |
| 2014/0262066 | A1 | 9/2014 | Certain et al. | |
| 2014/0262068 | A1 | 9/2014 | Buccola, Jr. et al. | |
| 2014/0262069 | A1 | 9/2014 | Drew et al. | |
| 2015/0007946 | A1 | 1/2015 | Yu et al. | |
| 2015/0034260 | A1 | 2/2015 | Blair et al. | |
| 2015/0047792 | A1 | 2/2015 | Lukosiunas et al. | |
| 2015/0059991 | A1 | 3/2015 | Kwak | |
| 2015/0107786 | A1 * | 4/2015 | Colson | E06B 9/262 160/266 |
| 2016/0138332 | A1 * | 5/2016 | Lukosiunas | E06B 9/26 160/84.05 |
| 2017/0081915 | A1 | 3/2017 | Buccola, Jr. et al. | |
| 2017/0211322 | A1 | 7/2017 | Smith et al. | |

FOREIGN PATENT DOCUMENTS

| | | | | |
|---|---|---|---|---|
| JP | H05179878 | A | | 7/1993 |
| JP | H07279560 | A | | 10/1995 |
| JP | H08144667 | A | | 6/1996 |
| JP | H09170390 | A | | 6/1997 |
| JP | 2008188470 | A | | 8/2008 |
| JP | 2008231913 | A | | 10/2008 |
| KR | 20060066012 | A | | 6/2006 |
| KR | 100675556 | B1 | | 2/2007 |
| KR | 100943408 | B1 | | 2/2010 |
| KR | 20110139082 | A | | 12/2011 |
| KR | 20180046770 | A | * | 10/2016 |
| WO | 9937876 | | | 7/1999 |
| WO | 2013033014 | A | | 3/2013 |
| WO | 2014143057 | A1 | | 9/2014 |

OTHER PUBLICATIONS

PCT International Search Report and Written Opinion for related PCT Application No. PCT/US2014/052655 dated Dec. 15, 2014, 9 pages.

PCT International Preliminary Report on Patentability for corresponding PCT Application No. PCT/US2020/020916 dated Mar. 19, 2011, 6 pages.

PCT International Search Report and Written Opinion for corresponding PCT Application No. PCT/US2020/020916 dated Jul. 2, 2020, 17 pages.

* cited by examiner

BOTTOM RAIL FOR DOUBLE PANEL WINDOW SHADING AND METHOD TO OPERATE SAME

BACKGROUND

1. Technical Field

The present disclosure relates to window shades, and more particularly, to a bottom rail for a double panel window shading. The present disclosure can be adapted to operate, e.g., window shading assemblies with two shading sheets or panels or supports coupled together by several vanes.

2. Background Art

As depicted in FIGS. 1-3, some window shading assemblies 120 may include a double-panel shading element 108 having a front panel 102 and a rear panel 104 and a plurality of vanes 106 extending therebetween. It will be appreciated that as used herein, a "panel" may be in the form of a sheet or facing or other type of support element for supporting the vanes, such as a support element having a distinct width, e.g., similar to the width of the vanes. Shading element 108 includes front and rear panels 102, 104 that can be wound about a roller or rotator tube 110 for selectively rolling and unrolling shading element 108. Roller 110 can be positioned within a headrail or casing 112 so that shading element 108, when rolled about roller 110 in a retracted position, is substantially contained within casing 112. Shading element 108 can include, at a bottom end opposite the end of shading element 108 coupled to roller 110, a bottom rail 114 for coupling to front and rear panels 102, 104, in addition to defining a lower vertical position of shading element 108. Roller 110 can be mounted to a particular wall, window frame, architectural fixture, etc., by way of endcaps or brackets or casing 112. Each panel 102, 104 in shading element 108 can be composed of a high transparency material, with vanes 106 being composed of a less translucent fabric and spaced apart at even and/or uneven spaced intervals.

As shown in FIG. 2, shading element 108 can be mounted to roller 110 such that when roller 110 is rotated to a first position, front and rear panels 102, 104 can hang from opposing front and rear sides of the assembly in an open position. In this open position, front and rear panels 102, 104 of shading element 108 can be spaced apart, and vanes 106 may extend horizontally between front and rear panels 102, 104, thus providing a horizontal opening for light transmission through window shading 120. When roller 110 is rotated in a first direction by an actuating device (e.g., a cord 118), movement of roller 110 can raise rear panel 104 (which may face externally toward the window) relative to front panel 102 (which may face internally toward the inside of the room where the shading is hung). The first effect of such rotation is to adjust the angle of vanes 106 with respect to front and rear panels 102, 104, and thereby bring front and rear panels 102, 104 close together to a closed position. In the closed position, vanes 106 will reduce the translucency or block light transmission through front and rear panels 102, 104. Further rotation of roller 110 in the same direction (e.g., with cord 118) can then roll both panels 102, 104 onto roller 110, retracting shading element 108 from the window area as in a roller shade. Unrolling shading element 108 of window shading 120 can reverse this process. For example, front and rear panels 102, 104 can be lowered to cover the window area, then, with a final partial turn of roller 110, front and rear panels 102, 104 can be shifted with respect to each other such that vanes 106 are tilted to provide light therethrough. Bottom rail 114 can act to maintain panels 102, 104 in smooth, level planes, by tension, and can induce vanes 106 to flex as needed by providing additional weight.

Although bottom rail 114 may support the structure and operation of window shading 120, it may also be the source of various technical challenges and limitations. For instance, bottom rail 114 may continually apply downward tension to both panels 102, 104 regardless of whether window shading 120 is in an open or closed position. As shown specifically in FIG. 3, this continual downward tension on both panels 102, 104 may affect light transmission across window shading 120 through panels 102, 104. For example, the downward tension from bottom rail 114 on second panel 104 may prevent an upper surface of one vane 106 from being positioned close to the bottom surface of an adjacent vane 106. In some cases, the position of vanes 106 when closed may permit light to pass through window shading 120 via a space S. In cases where panels 102, 104 include features for blocking light transmission (e.g., printed fabrics, textures, etc.), the non-overlapping space S between vanes 106 will be inconvenient to a prospective user of window shading 120.

BRIEF SUMMARY

The present disclosure in various embodiments provides a bottom rail for a double panel window shading, methods to operate the same, and other features. The disclosure may provide a bottom rail having a body, a first connection point on the body coupled to a first panel of the window shading, and a second connection point on the body coupled to a second panel of the window shading. The body has a weight distribution of the body that causes a center of gravity of the bottom rail to be closer to the first connection point than the second connection point. Further, the body has a weight distribution that causes a center of gravity of the bottom rail to be on a side of a plane through the first and second connection points opposing the body. In an open position of the double panel window shading, the vanes extend relatively horizontally, allowing light transmission through the panels. Also in the open position, the center of gravity may be located vertically above the plane and between the first and second connection points of the bottom rail, and thus between the first and second panels. A downward tensile force is distributed between the two connection points in the open position. To move to a closed position of the window shading, the second connection point may be rotated about the first connection point to position the center of gravity of the bottom rail in front of the first panel of the double panel window shading, i.e., outside of the first and second panels. In the closed position, the second panel shifts vertically, moving the vanes of the shading to extend relatively vertically, reducing or eliminating light transmission through the window shading. Also in a closed position of the window shading, the center of gravity is in a position where the first connection point solely exerts downward tensile force on the first panel without the second connection point exerting downward force on the second panel. The second panel thus may be slack and substantially free of tension when the double panel window shading is closed, preventing any spacing between ends of vanes that may accidentally allow unwanted light through the panels. A user may return the second connection point to its previous location to move the window shading into the open position.

One aspect of the disclosure provides a bottom rail for a double panel window shading having opposing first and second panels coupled by a plurality of vanes, said bottom rail comprising: a body; a first connection point on the body coupled to the first panel; and a second connection point on the body coupled to the second panel, wherein a weight distribution of said body causes a center of gravity of said bottom rail to be closer to said first connection point than said second connection point, and wherein said bottom rail is adjustable between: an open position in which the plurality of vanes are substantially horizontal between the opposing first and second panels, and: said first connection point exerts a first downward tensile force on the first panel, said second connection point exerts a second downward tensile force on said second panel, and the center of gravity of said bottom rail is horizontally between the opposing first and second panels, and a closed position in which the plurality of vanes have a substantially vertical orientation between the opposing first and second panels, and: said first connection point exerts the first downward tensile force and the second downward tensile force on the first panel, and said second connection point does not exert the second downward tensile force on the second panel.

An additional aspect includes a method for operating a double panel window shading having opposing first and second panels operably associated with a roller, the first and second panels coupled by a plurality of vanes, the method comprising: applying a first downward tensile force on the first panel and a second downward tensile force on the second panel through a bottom rail coupled to the double panel window shading, said bottom rail including: a body, a first connection point on said body coupled to the first panel, and a second connection point on said body coupled to the second panel, wherein a weight distribution of said body causes a center of gravity of said bottom rail to be closer to said first connection point than said second connection point; and adjusting the roller to rotate said second connection point of said body about said first connection point to a position in which said bottom rail exerts the first and the second downward tensile forces solely on said first panel without exerting any of the first or second downward tensile forces on the second panel.

Another aspect includes an assembly for adjusting a double panel window shading having opposing first and second panels coupled by a plurality of vanes and operably associated with a roller, said assembly comprising: a bottom rail including: a body, a first connection point on the body coupled to the first panel, and a second connection point on the body coupled to the second panel, wherein a weight distribution of said body causes a center of gravity of said bottom rail to be on a side of a plane through said first connection point and said second connection point opposing the body; and an initiator weight coupled to the second panel; wherein said assembly is adjustable between: an open position in which the plurality of vanes are substantially horizontal between the opposing first and second panels, and: said first connection point exerts a first downward tensile force on the first panel, said second connection point exerts a second downward tensile force on said second panel, and said center of gravity of said bottom rail is horizontally between the opposing first and second panels, and a closed position in which the plurality of vanes have a substantially vertical orientation between the opposing first and second panels, and: said first connection point exerts the first and second downward tensile forces on the first panel, and said second connection point does not exert the second downward tensile force on the second panel; and an initial opening position in which said first connection point exerts the first downward tensile force on the first panel, and said initiator weight exerts a tensile force on the second panel such that said second connection point rotates about the first connection point of said body to the open position.

An additional aspect includes a bottom rail assembly for a double panel window shading having opposing first and second panels coupled by a plurality of vanes, said bottom rail assembly comprising: a first portion coupled to the first panel and having a first weight; a second portion coupled to the second panel and having a second weight less than the first weight; and an intermediate portion coupling said first portion to said second portion, wherein said bottom rail assembly is adjustable between: an open position in which said first portion exerts a downward tensile force on the first panel, said second portion exerts a downward tensile force on said second panel, allowing the plurality of vanes to extend between the opposing first and second panels, and wherein a center of gravity of said bottom rail assembly is between the opposing first and second panels; and a closed position in which said first portion, said second portion, and said intermediate portion exert the downward tensile force on the first panel, said second portion does not exert the downward tensile force on the second panel, the plurality of vanes extend substantially vertically between the opposing first and second panels, and the center of gravity of said bottom rail assembly moves said second portion of said bottom rail assembly toward the first panel.

Another aspect includes an initiator weight coupled to the second panel of the double panel window shading, wherein said initiator weight is configured to shift the center of gravity of said bottom rail assembly toward the second panel as said bottom rail assembly is moved from the closed position to the open position.

Yet another aspect includes said initiator weight being operably coupled to a rotator tube of the double panel window shading through the second panel, and said rotator tube being configured to lower the second panel relative to the first panel.

Another aspect includes at least one of the plurality of vanes visually obscuring a position of said initiator weight in the closed position.

An additional aspect includes the initiator weight being configured to shift the center of gravity of said bottom rail assembly toward the second panel in response to a rotation of a rotator tube of the double panel window shading.

Yet another aspect includes the first portion or second portion including an opening configured to receive at least one weight therein.

Another aspect includes the intermediate portion including a contoured surface, the contoured surface including a coupling component for engaging a weight.

Another aspect of the disclosure provides a window shading assembly, comprising: a double panel window shading having opposing first and second panels operably associated with a rotator tube, the first and second panels coupled by a plurality of vanes; a bottom rail assembly including: a first portion coupled to said first panel and having a first weight; a second portion coupled to said second panel and having a second weight less than the first weight; and an intermediate portion coupling said first portion to said second portion, wherein said bottom rail assembly is adjustable between: an open position in which said first portion exerts a downward tensile force on said first panel, said second portion exerts a downward tensile force on said second panel, said plurality of vanes extend between said opposing first and second panels, and a center of gravity of said bottom rail assembly is between said opposing first and second panels; and a closed position in which said first portion, said second portion, and said intermediate portion exert the downward tensile force on said first panel, said second portion does not exert the downward tensile force on said second panel, allowing said plurality of vanes to extend substantially vertically between said opposing first and second panels, and the center of gravity of said bottom rail assembly moves said second portion of said bottom rail assembly toward said first panel; and an initiator weight coupled to said second panel of said double panel window shading, wherein said initiator weight is configured to shift said center of gravity of said bottom rail assembly toward said second panel.

An additional aspect includes the initiator weight being operably coupled to the rotator tube of the double panel window shading through the second panel.

Another aspect includes at least one of the plurality of vanes visually obscuring a position of said initiator weight in the closed position.

Yet another aspect includes the initiator weight being configured to shift the center of gravity of said bottom rail assembly out of substantial vertical alignment with said first panel as said bottom rail assembly moves from the open position to the closed position.

Another aspect includes the first portion or the second portion including an opening configured to receive at least one weight therein.

Yet another aspect includes the intermediate portion including a contoured surface, the contoured surface including a coupling component for engaging a weight.

Another aspect includes the plurality of vanes including a substantially opaque material, and wherein said plurality of vanes in the closed position substantially prevents passage of light through said double panel window shading.

An additional aspect includes a method for operating a double panel window shading having opposing first and second panels operably associated with a rotator tube, and coupled by a plurality of vanes, the method comprising: coupling a bottom rail assembly to the double panel window shading, said bottom rail including: a first portion having a first weight; a second portion having a second weight; and an intermediate portion coupling said first portion to said second portion, wherein coupling said bottom rail assembly to the double panel window shading causes said first portion to exert a downward tensile force on the first panel, and causes said second portion to exert a downward tensile force on the second panel; and adjusting the rotator tube to rotate said second portion with respect to said first portion, and shift a center of gravity of said bottom rail assembly to a position in which said second portion of said bottom rail assembly moves toward said first panel, causing said first portion, said second portion, and said intermediate portion to exert the downward tensile force on said first panel, and said second portion to cease exerting the downward tensile force on the second panel.

Yet another aspect includes adjusting the rotator tube to shift the center of gravity of said bottom rail assembly to a position in which said second portion of said bottom rail assembly moves away from said first panel after rotating said second portion and causes said second portion to resume applying the downward tensile force on said second panel.

Another aspect includes adjusting the rotator tube causes an initiator weight coupled to said second panel to move away from said second panel.

An additional aspect includes said initiator weight shifting the center of gravity of said bottom rail away from said first panel upon actuation of the rotator tube.

Another aspect includes the center of gravity of said bottom rail assembly being in substantial vertical alignment with said first panel causes at least one of said plurality of vanes to partially horizontally overlap an adjacent vane.

Yet another aspect includes coupling a weight to one of said first portion or said second portion of said bottom rail assembly before rotating said second portion.

Another aspect includes an assembly for adjusting a double panel window shading having opposing first and second panels coupled by a plurality of vanes, said assembly comprising: a bottom rail having a first end coupled to the first panel of the double panel window shading and an opposing second end coupled to the second panel of the double panel window shading, said bottom rail adjustable between: a first position in which said first end exerts a downward tensile force on the first panel, said second end exerts a downward tensile force on the second panel, and a center of gravity of said bottom rail is between the opposing first and second panels; and a second position in which said first end and said second end exert the downward tensile force on the first panel, said second end does not exert the downward tensile force on the second panel.

An additional aspect includes the center of gravity of said bottom rail in the second position causes said second end of said bottom rail to move toward the first panel.

Another aspect includes an assembly for adjusting a double panel window shading having opposing first and second panels coupled by a plurality of vanes and operably associated with a rotator tube, said assembly comprising: a bottom rail having a first end fixedly coupled to the first panel of the double panel window shading and an opposing second end flexibly coupled to the second panel of the double panel window shading; and an initiator weight fixedly coupled to the second panel, wherein said bottom rail is adjustable between: a first position in which said first end exerts a downward tensile force on the first panel, said second end and said initiator weight exert a downward tensile force on the second panel, and a center of gravity of the bottom rail is between the opposing first and second panels; a second position in which said first end and said second end exert the downward tensile force on the first panel, said second end does not exert the downward tensile force on the second panel, and the center of gravity of said bottom rail is moves said first end of said bottom rail toward the first panel; and an initial opening position in which said first end exerts the downward tensile force on the first panel, said initiator weight exerts a downward tensile force on the second panel, and said second end of said bottom rail does not exert the downward tensile force on the second panel, such that the center of gravity of said bottom rail moves said second end of said bottom rail toward the first panel.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
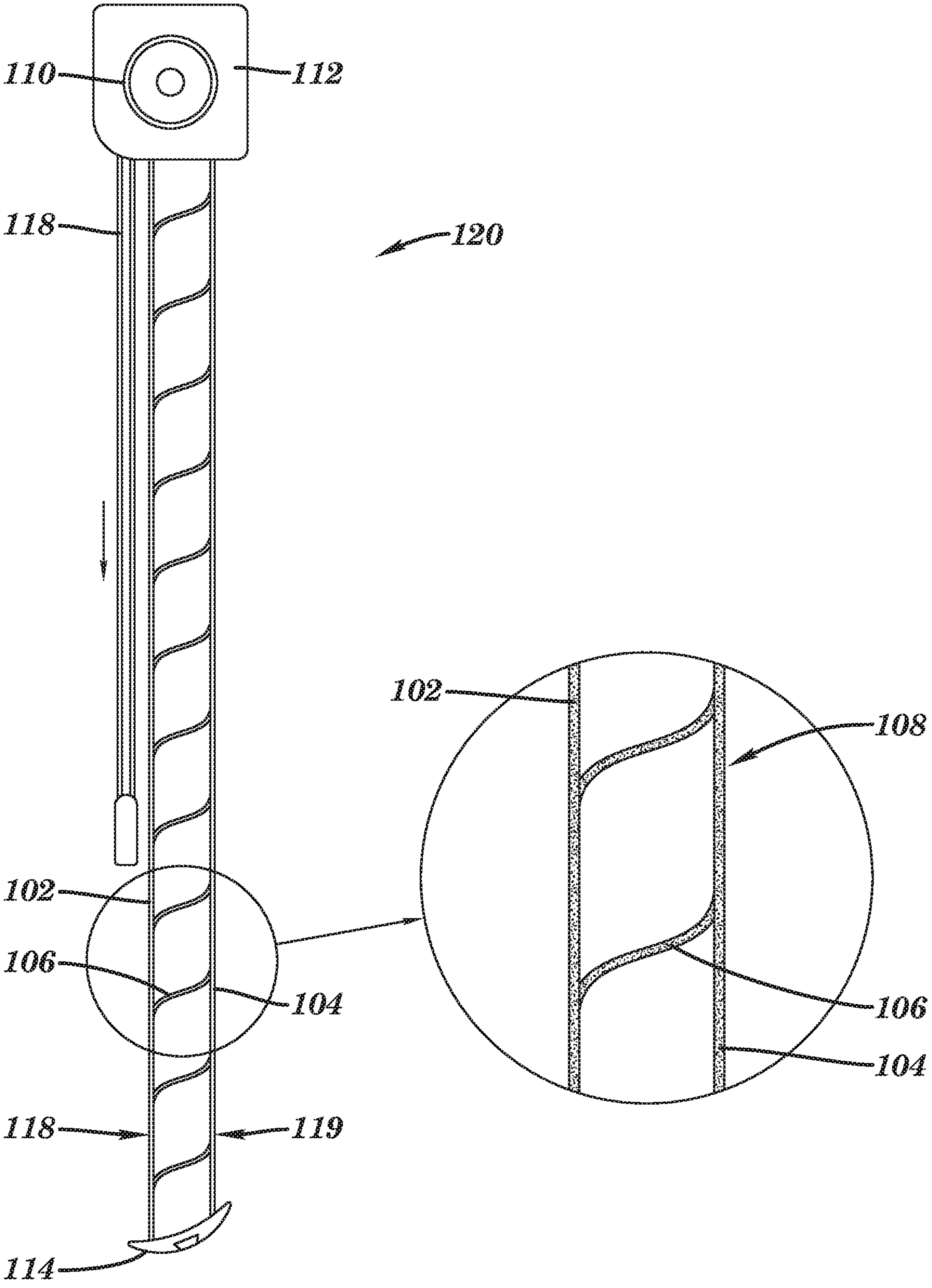
FIG. 1 PRIOR ART
FIG. 1 shows a side view of a conventional window shading.
Figure 2:
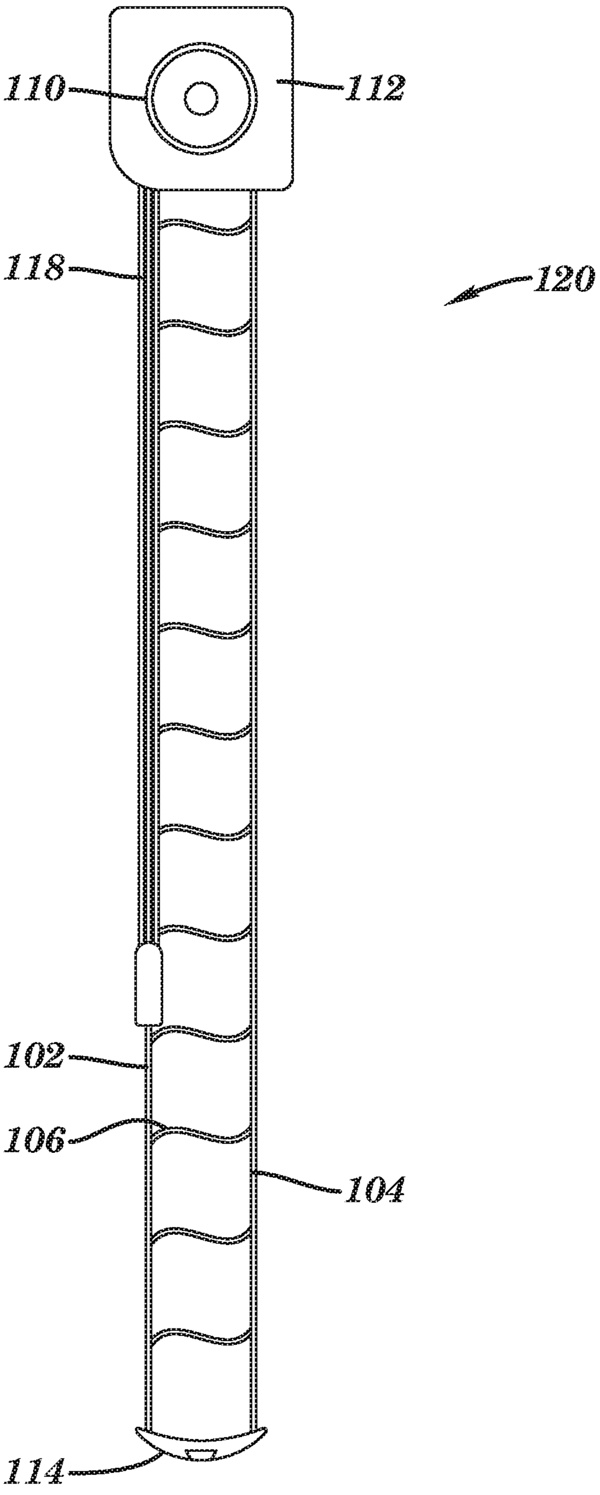
FIG. 2 PRIOR ART
FIG. 2 shows a side view of the conventional window shading with two panels in an open position.
Figure 3:
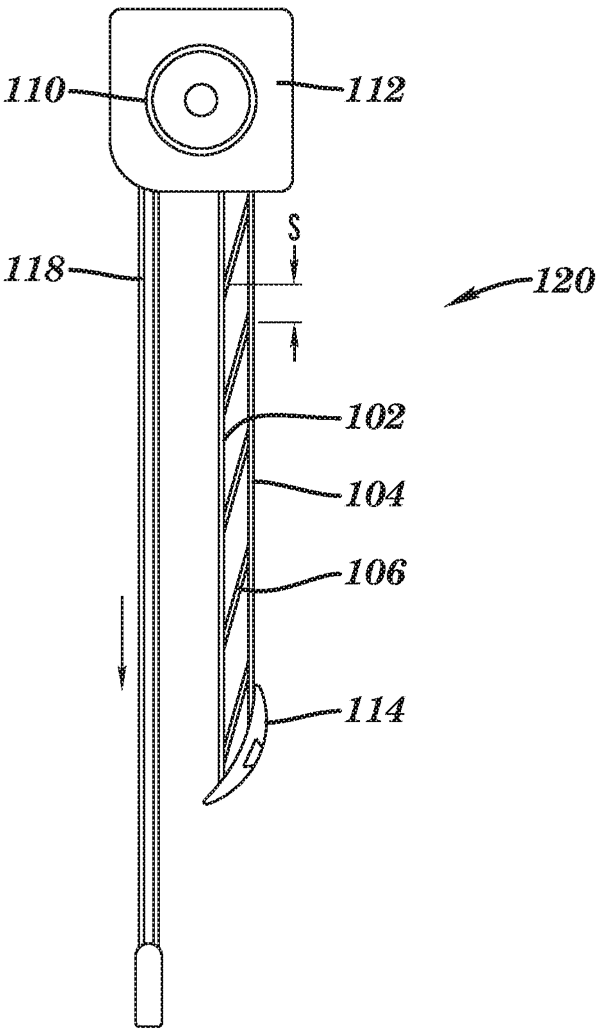
FIG. 3 PRIOR ART
FIG. 3 shows a side view of the conventional window shading with two panels in a closed position.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Embodiments of the present disclosure provide a bottom rail for double panel window shading assemblies, and methods for operating the same. A double panel window shading may include opposing first and second panels coupled through a plurality of vanes. Embodiments of the present disclosure may prevent gaps of space from forming between vertically adjacent vanes of a double panel window shading in a closed position. Embodiments of the disclosure may be especially effective for window shading assemblies that feature vanes formed of a particularly stiff or thick material, e.g., vanes formed of printed or textured fabrics. Even when such materials are included in a double panel window shading, embodiments of the disclosure may reduce or eliminate gaps between adjacent vanes of the shading when it is closed.

Embodiments of the present disclosure can include a bottom rail with various subcomponents for aiding vane closure of a double panel window shading. The bottom rail may include, e.g., a body with a first connection point coupled to the first panel and a second connection point coupled to the second panel. A weight distribution of the body causes a center of gravity of the bottom rail to be closer to the first connection point than the second connection point. Further, a weight distribution of the body causes the bottom rail's center of gravity to be on a side of a plane through the first and second connection points opposing the body, and vertically above the plane when the bottom rail is oriented horizontally and the vanes are in an open position. In an open position in which the vanes extend relatively horizontally and allow light to pass through the shading, the first and second connection points of the bottom rail exert first and second downward tensile forces on the first panel and second panel, respectively. To close the shade, the vanes are moved into a substantially vertically-extending position to reduce or prevent light transmission across the panels. To close the shade, a user may apply upward force to part of the bottom rail without applying the upward force to another part of the bottom rail. The physical attachment of the bottom rail to the two panels of the window shading, through the first connection point and the second connection point, will cause the second connection point to rotate about the first connection point. This rotation causes the second connection point to cease exerting the second downward tensile force on the second panel, and the first connection point to exert the first and second downward tensile forces on the first panel. The resulting change in applied tensile force may arise from the body's center of gravity being moved to a position that is in front of the first panel, i.e., horizontally outside or forward of each of the first and second panels, relative to a window or other element located behind the window shading.

When downward tensile force is not applied on the second panel (e.g., at the rear of the shading), the vanes will not move out of their substantially vertical orientation in the closed position. Thus, the window shading remains stationary in the closed position until a user or other external force acts on the window shading. In some cases, the bottom rail may include an initiator weight for transitioning the window shading into an open position from a closed position. This arrangement is in contrast to substantially horizontal bottom rail configurations that cause force to be directed uniformly along the bottom surface of the shading, regardless of whether the shading is open or closed. As discussed herein, various structural and operational features of the disclosure may allow the shade to open and close more easily, e.g., by pulling the vanes into an open configuration or removing weight from the vanes when they are in a closed configuration. In the closed configuration, downward tensile force from the bottom rail may act exclusively on the first panel. In some cases, this downward tensile force may be strong enough to ensure that adjacent vanes of the shading at least partially overlap each other.

It will be appreciated that a window shading is an example setting where a double panel shading and bottom rail according to the embodiments of the disclosure may be applied. It will further be appreciated that in the illustrated embodiments of a window covering in the form of a window shading, opening and closing of the window shading to adjust light transmission therethrough is achieved by moving one panel vertically relative to another to re-orient the vanes. For purposes of description, the rear panel closest to the window is described as moving vertically upward or downward relative to the front panel to adjust the light transmission of the vanes. In this case, the rear panel of the shading may function as the "second panel," and the front panel may function as the "first panel." It will be recognized that the function and/or operation of the panels and the bottom rail may be switched from that described. In this alternative configuration, the front panel farthest from the window may move vertically upward or downward relative to the rear panel to adjust the light transmission of the vanes. Here, the front panel of the shading may function as the "second panel," and the rear panel may function as the "first panel." It will be appreciated that directional references are illustrative and to be taken in context of the example shading being described, and to be understood relative to other directional references in a given example.

Figure 4:
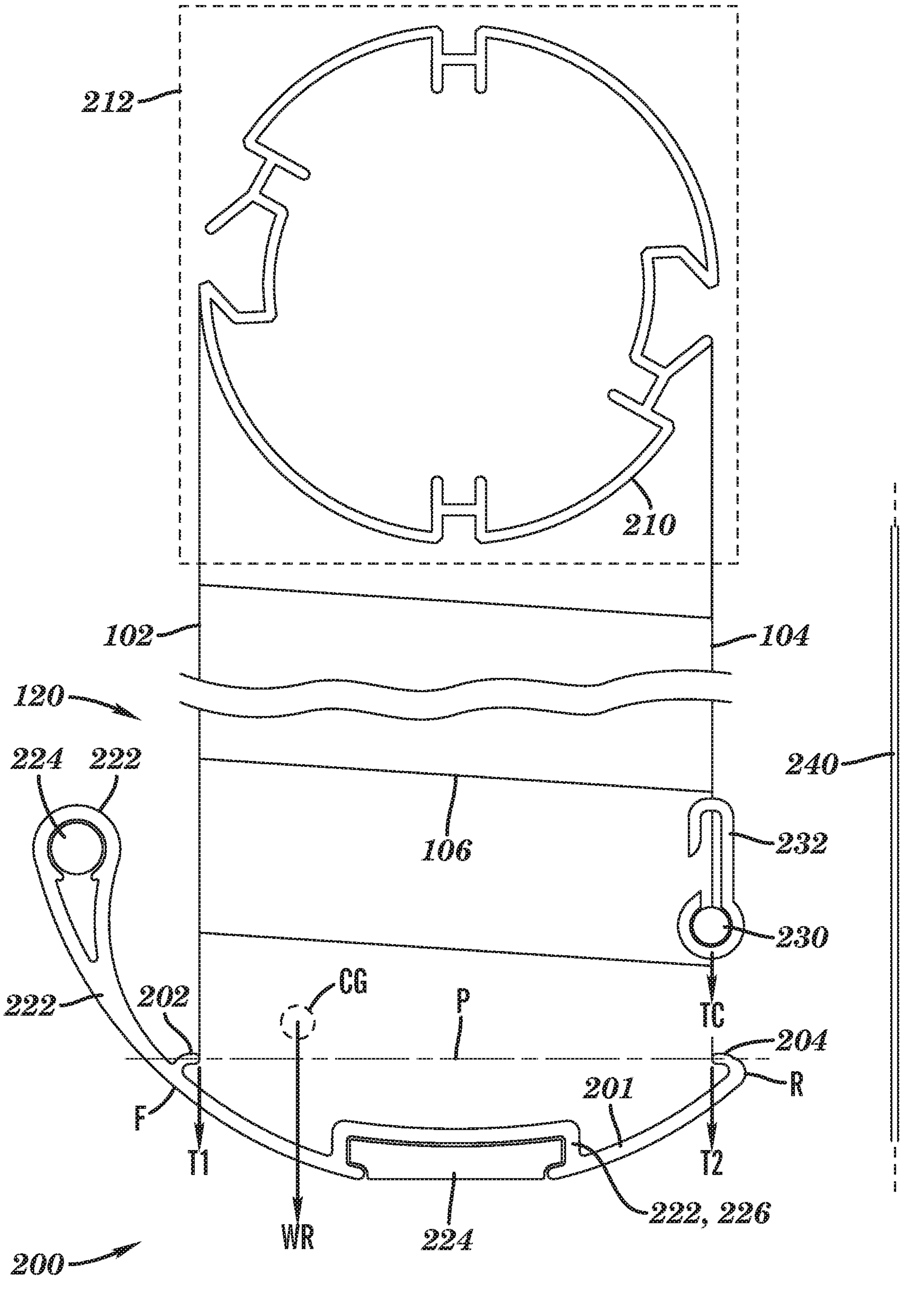
FIG. 4 shows a side view of a window shading and bottom rail in an open position, according to embodiments of the present disclosure.

Referring to FIG. 4, an embodiment of a bottom rail 200 for window shading 120 is shown. In some cases, bottom rail 200 thereof may be a single extrusion, i.e., a unitary structure. Alternatively, bottom rail 200 may include a combination of extruded members, e.g., extruded elements coupled together. Bottom rail 200 may also have alternative implementations, and may be formed by other manufacturing techniques, e.g., machining from a billet and cutting, cast metal processing, injection molding, etc. In any event, bottom rail 200 is cut or otherwise sized to a selected width to cover a surface 240, e.g., of a window or other structure to be covered by window shading 120.

Window shading 120 can include first and second panels 102, 104 coupled to bottom rail 200, respectively, e.g., at or near a front location F and/or rear location R of bottom rail 200. Although front and rear positions F, R, are identified herein such that the "front" faces leftward and the "rear" faces rightward, it is understood that these orientations may be reversed and/or modified based on an intended application of bottom rail 200. Bottom rail 200 may be coupled to and operably associated with first, front panel 102 and a second, rear panel 104. Bottom rail 200 may have a curved, crescent-shape, or contoured surface below window shading 120. However, it is understood that bottom rail 200 may have any desired shape or profile between panels 102, 104, including one or more non-contoured shapes in some implementations. A plurality of vanes 106 couple first and second panels 102, 104. Vanes 106 may be formed of a substantially opaque material to impede or prevent the passage of light therethrough.

Bottom rail 200 may be, or include, a body 201, which defines the size and shape of bottom rail 200. Body 201 may take the form of a single component (i.e., bottom rail 200 may be one piece), or alternatively may be formed of several structurally distinct and mechanically interconnected members, as noted for bottom rail 200. Body 201 may have a contoured profile (e.g., curvilinear or other non-planar shape) as shown by example in FIG. 4. Body 201 may be contoured in a substantially arcuate or otherwise non-linear shape, thereby causing bottom rail 200 to have a substantially horizontal upward or downward curve along the bottom surface of window shading 120. However, it is understood that body 201 may have any desired shape or profile, including one or more non-contoured shapes in some implementations.

Bottom rail may include, e.g., a first portion coupled to first panel 102 of the double panel shading and a second portion coupled to second panel 104 of double panel shading 120. A first weight of the first portion is selected to be greater than a second weight of the second portion, thereby causing the bottom rail to have a center of gravity CG that is closer to the first portion than the second portion. In other words, as will be described further, the body or bottom rail has a weight distribution that causes a center of gravity of the bottom rail to be closer to the first portion and its connection point to the first panel than the second portion and its connection point to the second panel. An intermediate portion couples the first portion to the second portion. In an open position in which the vanes extend relatively horizontally and allow light to pass through the shading, the first and second portions exert a downward first tensile force on the first panel and second panel, respectively. The first portion of bottom rail 200 may include a first connection point 202 on body 201. First connection point 202 may be coupled to first panel 102, e.g., at a lowermost end of first panel 102. First connection point 202 may be coupled to first panel 102 by way of any conceivable flexible or partly flexible mechanical coupling, e.g., with the aid of a non-fixed connection point, knot, etc., to allow first panel 102 to fasten to bottom rail 200 under various circumstances as noted herein. First connection point 202 may have any desired shape or profile. For example, first connection point 202 may be a fixed protrusion extending outward from body 201. In the example illustrated in FIG. 4, first connection point 202 may be embodied as a fixed element that is structurally continuous with body 201.

The second portion of bottom rail 200 may include a second connection point 204 on body 201. Second connection point 204 may be coupled to second panel 104, e.g., at a lowermost point of second panel 104. Second connection point 204 may be coupled to second panel 104 by way of any flexible or partly flexible mechanical coupling, e.g., with the aid of a non-fixed connection point, knot, etc., to allow second panel 104 to fasten under various circumstances as noted herein. Bottom rail 200 thus may be flexibly coupled to window shading 120 through second panel 104. Second connection point 204 may have any desired shape or profile. For example, second connection point 204 may be a fixed protrusion extending outward from body 201, e.g., at or near rear location R. In the example illustrated in FIG. 4, second connection point 204 may be embodied as a fixed element that is structurally continuous with body 201. Thus, body 201 and first and second connection point 202, 204 may comprise a unitary structure. In some cases, body 201 may refer to any structure or collection of structures extending between, and coupled to, first and second connection points 202, 204. Body 201 may also include any structures and/or portions thereof that extend beyond the location of first and/or second connection points 202, 204. It is emphasized that front and rear positions F, R may be different from, or the same as, the location of first connection points 202, 204, based on the size and shape of body 201 and/or the manner in which bottom rail 200 connects to first panel 102 and second panel 104.

One or more rollers, rotator tubes, or other rotatable adjustment mechanisms (collectively "roller(s)" hereafter) 210 may be coupled to bottom rail 200 through first panel 102 and second panel 104. Roller(s) 210 may be configured for actuation and/or adjustment by any currently known or later developed device or methodology. In non-limiting examples, roller(s) 210 may be actuated by cord-based assemblies and/or non-cord-based assemblies. Regardless of how roller(s) 210 operate, first panel 102 may couple roller(s) 210 to bottom rail 200 at first connection point 202, and second panel 104 may couple roller(s) 210 to bottom rail 200 at second connection point 204 in an example implementation. Roller(s) 210 may be operatively coupled to each panel 102, 104, and may be housed inside an upper member 212 such as a headrail or similar structure shaped to hold roller(s) 210 therein. A single roller 210 may be coupled to each panel 102, 104, or multiple rollers 210 may be coupled together in a predetermined arrangement, e.g., axial mechanical couplings within upper member 212 (FIG. 4). Roller(s) 210, however embodied, may rotate to raise or lower each panel(s) 102 and/or 104 to vertically displace panel(s) 102, 104 with respect to each other, and correspondingly adjust the location and/or orientation of bottom rail 200 and vanes 106. Once in a closed position, roller(s) 210, however embodied, may also further rotate to retract panels 102, 104 thereon. Conversely, as understood in the art, in a rolled up position (not shown), roller(s) 210 may be rotated by any conceivable device or method to dispense panels 102, 104 therefrom.

Figure 5:
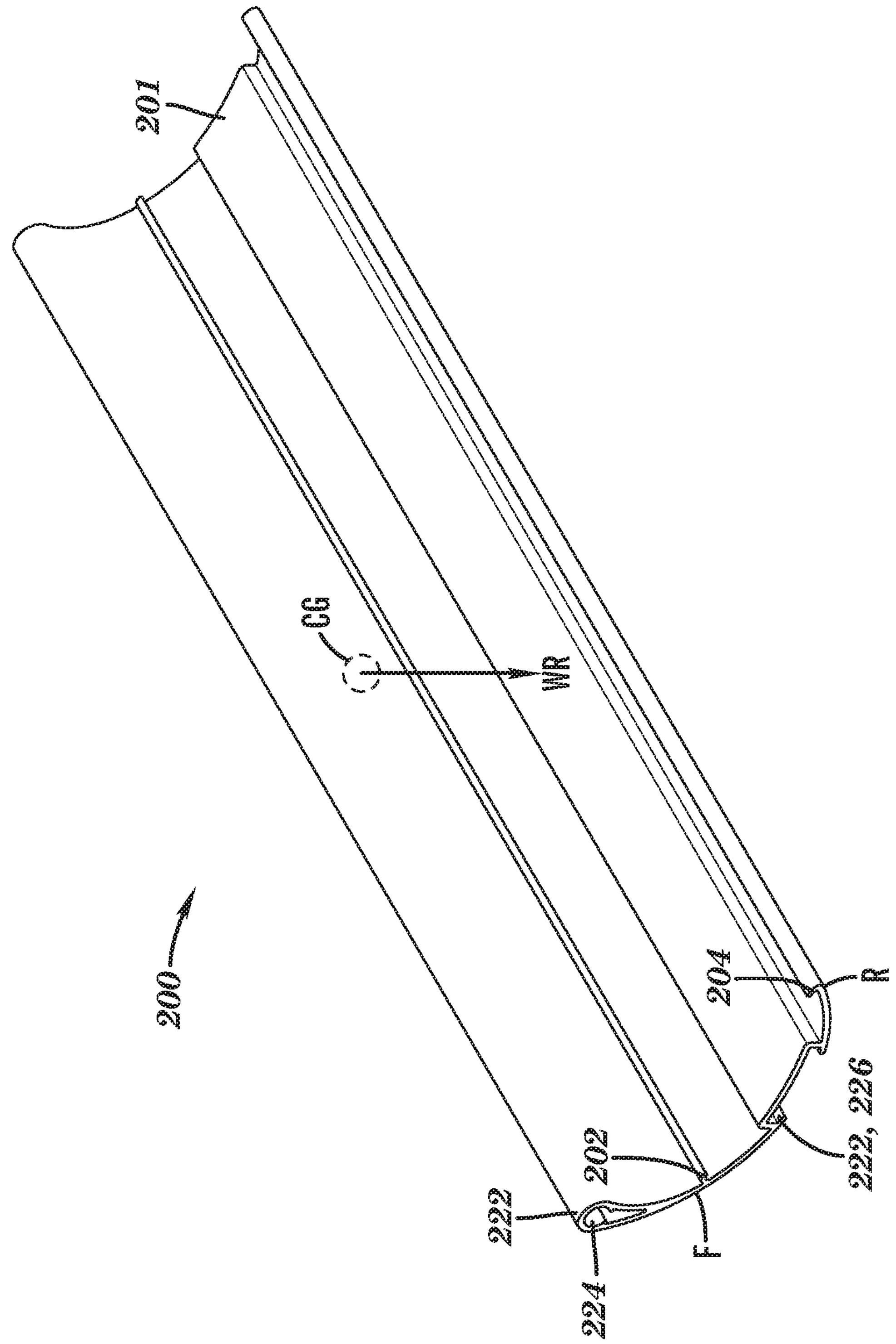
FIG. 5 shows a perspective view of the bottom rail, according to embodiments of the present disclosure.
Figure 6:
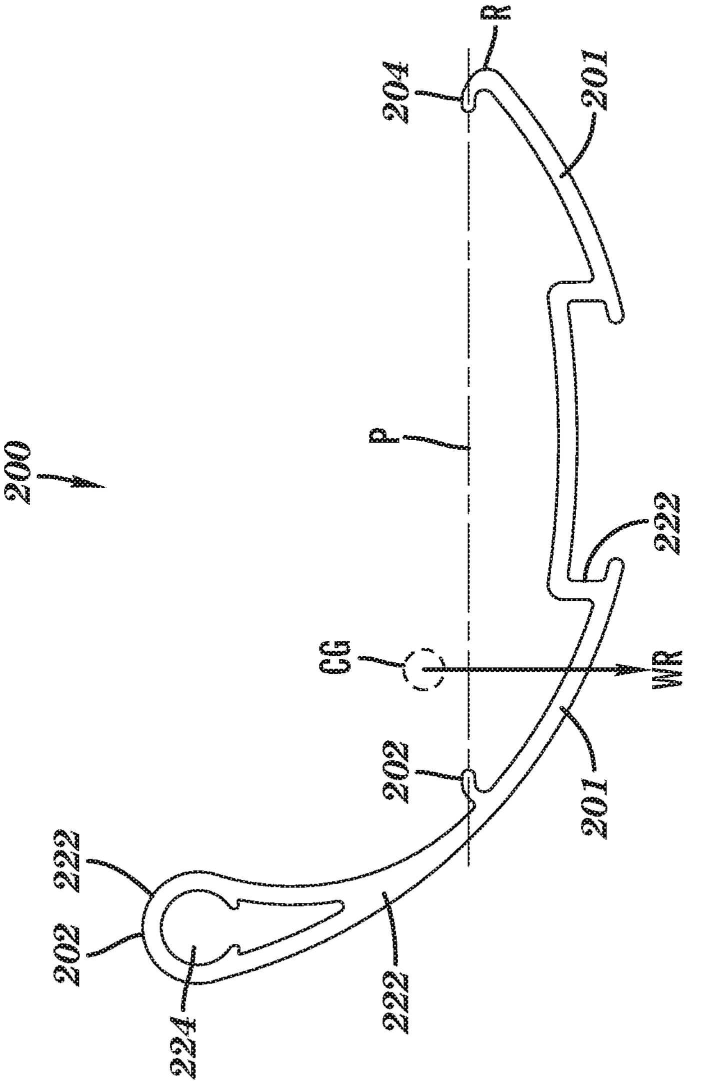
FIG. 6 shows a side view of the bottom rail, according to embodiments of the present disclosure.

Referring to FIGS. 4-6 together, the weight distribution of body 201 may position a center of gravity CG of bottom rail 200 closer to first connection point 202 than second connection point 204. Further, the weight distribution may position center of gravity CG of bottom rail 200 to be on a side of a plane P through first connection point 202 and second connection point 204 opposing body 201. That is, center of gravity CG is on an opposite side of plane P from body 201, excepting perhaps optional coupling components 222 of body 201 positioning weights 224, described herein. Thus, body 201 may have a greater concentration of weight near first connection point 202 than second connection point 204, thereby positioning center of gravity CG closer to first connection point 202 than second connection point 204. The shape and weight distribution of body 201 may cause a resultant weight WR of bottom rail 200 to act from center of gravity CG, as shown. A limited number of mechanisms to form the weight distribution will be described herein. It is emphasized that the weight distribution can be created in body 201 and bottom rail 200 in any fashion.

First connection point 202 of bottom rail 200 may exert a first downward tensile force T1 (FIG. 4) on first panel 102, and second connection point 204 may exert a second and distinct downward tensile force T2 (FIG. 4) on second panel 104. In one embodiment, body 201 may include one or more weights 224 coupled thereto to create the desired weight distribution. Weights 224 may be coupled in any manner now known or later developed, e.g., fasteners, adhesive, etc. In one example, coupling components 222 may couple at least one weight 224 to body 201. Coupling components 222 may take any currently known or later developed form, e.g., slots, openings, recesses, attachment members, etc., shaped to receive and/or couple one or more weights 224 to body 201. In one example, coupling components 222 may include additional structural elements (e.g., slots, openings, etc., as shown in FIG. 4) on or coupled to body 201. Each coupling component 222 and/or weight 224 may be of a predetermined mass and shape, and may be customized to achieve the desired weight distribution for body 201, but also perhaps deployment setting and/or aesthetic preference. According to some examples, weight(s) 224 may be located distal to connection points 202, 204 such as weight 224 in FIG. 4 relative to first connection point 202. In FIG. 4, weight 224 is positioned distally forward of first panel 102, and first connection point 202. In another example, weight (s) 224 may be located between first and second connection points 202, 204 (see slot 226). While slot 226 is shown intermediate connections points 202, 204, any weight used therein may have more mass closer to first connection point 202. In other examples, shown in FIG. 9, weight(s) 224 may located proximal and slightly outside of connection points 202, 204. Where more than one weight 224 is used, they need not be the same mass or shape.

Weight(s) 224 may be selected to modify the weight distribution of bottom rail 200 from that which body 201 can create alone. Weight(s) 224 can modify the location of a center of gravity CG of bottom rail 200 relative to first and second connection point(s) 202, 204, and/or change the location of center of gravity CG relative to plane P, during operation. Weight(s) 224 can also be selected to modify downward tensile force(s) T1, T2 from that which body 201 alone can create. Such modification by weight(s) 224 may adapt bottom rail 200 for use with several types of window shading assemblies 120 with different, for example, roller size, the window shade assembly size and/or shape, panel/vane type, panel/vane weights, corded or cordless applications, etc. For example, where panel(s) 102, 104 and/or roller(s) 210 concentrate more weight at the front or rear horizontal ends of window shading 120, body 201 of bottom rail 200 may apply more tension to first connection point 202 than through second connection point 204. In cases where an imbalance of tension between first and second connection points 202, 204 is greater than a desired threshold, weight(s) 224 may be coupled to body 201 through coupling component(s) 222 to correct the situation.

Figure 7:
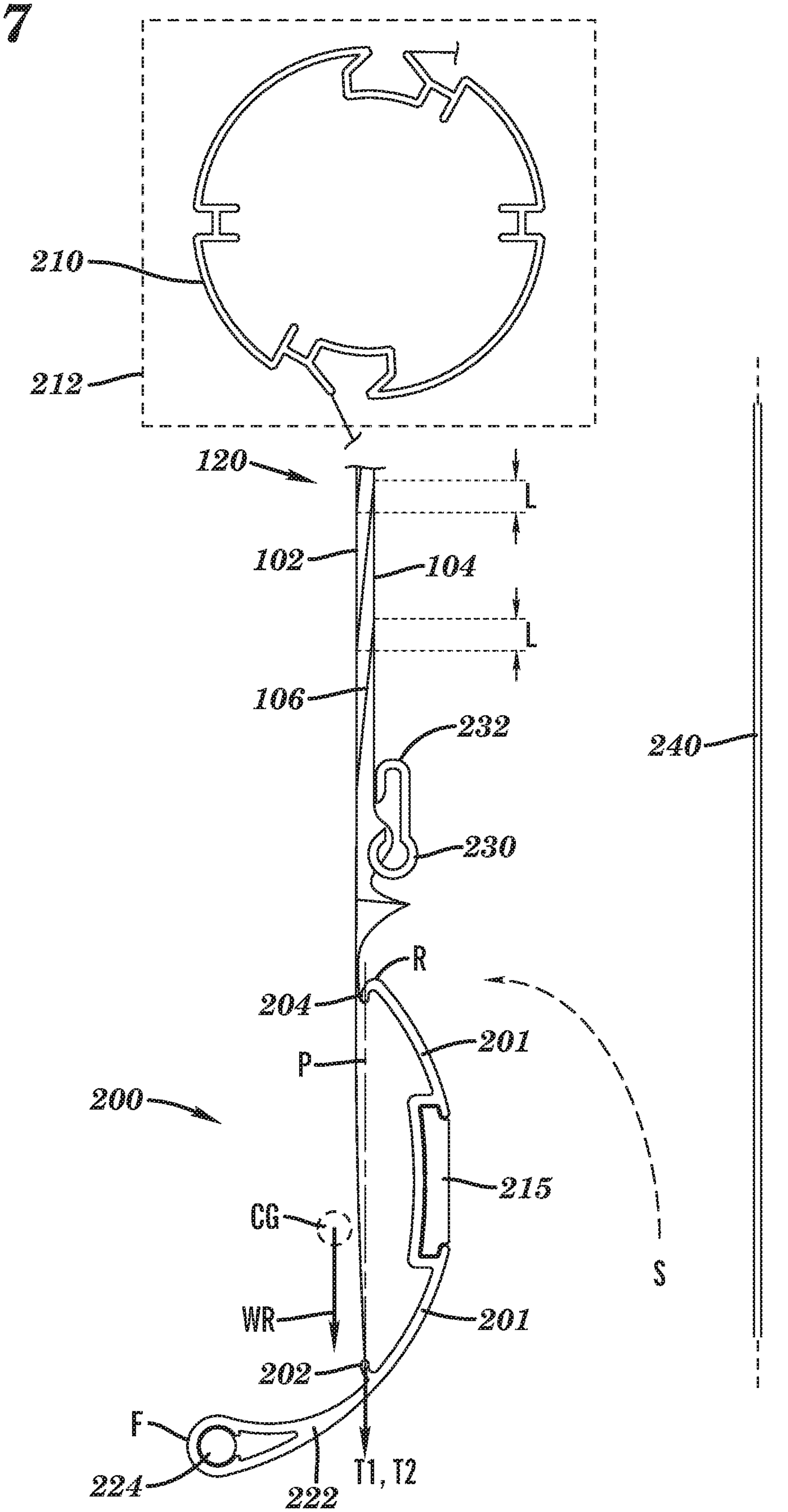
FIG. 7 shows a side view of a window shading and bottom rail in a closed position, according to embodiments of the present disclosure.

Referring now to FIGS. 4 and 7 together, the operation of bottom rail 200 in various embodiments is discussed. FIG. 4 depicts window shading 120 and bottom rail 200 in an open position, while FIG. 7 depicts window shading 120 and bottom rail 200 in a closed position. Embodiments of the disclosure provide structural and operational features for adjusting window shading 120 and bottom rail 200 between open and closed positions. FIG. 4 depicts window shading 120 and bottom rail 200 in an open (alternatively, "first") position which generally enables light to pass through or between first and second panels 102, 104 of window shading 120. In the open position, vanes 106 may be substantially horizontal between opposing first and second panels 102, 104. FIG. 7 depicts window shading 120 and bottom rail 200 in a closed (alternatively, "second") position which reduces or substantially prevents light from passing through or between panels 102, 104 and vanes 106 of window shading 120. In the closed position, vanes 106 have a substantially vertical orientation between opposing first and second panels 102, 104. Each position of window shading 120 and bottom rail 200 may be distinguished from each other based on the orientation of vanes 106 and bottom rail 200 and, as will be further described, the location of center of gravity CG and the presence or lack of downward tension applied by body 201 to second panel 104 through connection point 204.

FIG. 4 depicts window shading 120 and bottom rail 200 in an open position. In the open position, first connection point 202 exerts a first downward tensile force T1 on first panel 102, and second connection point 204 exerts a second downward tensile force T2 on second panel 104. Here, as noted, vanes 106 may extend substantially horizontally between panels 102, 104. As shown, vanes 106 in the open position may extend in a slightly or upward or downward orientation between panels 102, 104, and/or may also have a slight curve (like FIG. 1). Where vanes 106 are formed of a substantially opaque material and panels 102, 104 are formed of a translucent material, window shading 120 may allow light to pass through or between first and second panels 102, 104. In the open position, center of gravity CG may be located vertically above plane P and horizontally between panels 102, 104, such that resultant weight WR acts on bottom rail 200 at a location closer to first connection point 202 than second connection point 204. Here, first downward tensile force T1 is greater than second downward tensile force T2.

FIG. 7 depicts window shading 120 and bottom rail 200 in a closed position during operation. A user may apply external force to adjust window shading 120 and bottom rail 200 from the open position (e.g., as shown in FIG. 4) to a closed position (e.g., as shown in FIG. 7). Specifically, a user may adjust roller(s) 210 to rotate (i.e., rotate or pivot) second connection point 204 about first connection point 202 (see arrow S in FIG. 7) to another position. In such a position, bottom rail 200 exerts first and second downward tensile forces T1, T2 solely on first panel 102 without exerting any of the first or second downward tensile forces on second panel 104. The upward force applied to bottom rail 200 vertically displaces second panel 104 relative to first panel 102, and rotates second connection point 204 about first connection point 202. The rotation may cause a forward rotation of bottom rail 200. Arrow S (FIG. 7) indicates an example path by which second connection point 204 may rotate about first connection point 202. Rotating second connection point 204 with respect to first connection point 202 may position both panels 102, 104 in a horizontally distal or lateral location to center of gravity CG of bottom rail 200. That is, center of gravity CG is laterally outside (e.g., forward, of) first panel 102 and second panel 104. In contrast to the open position, first panel 104 is between body 201 and center of gravity CG of bottom rail 200. After the rotation concludes, resultant weight WR of bottom rail 200 may act substantially solely on first panel 102. That is, body 201 of bottom rail 200 ceases exerting second downward tensile force T2 (FIG. 4) while continuing to exert first and second downward tensile forces T1, T2 on first panel 102. First and second downward tensile force T1, T2 are applied to first panel 102 by first connection point 202. After second connection point 204 rotates, the coupling of second panel 104 to second connection point 204 becomes slack. In the closed position, vanes 106 become substantially vertically oriented due to the vertical movement of second panel 104 relative to first panel 102, and the lack of downward tensile force on second panel 104. As shown, an overlap distance L between adjacent vanes 106 may be sustained to substantially prevent horizontal gaps from forming between each vane 106, e.g., to substantially prevent light transmission between vanes 106.

Figure 8:
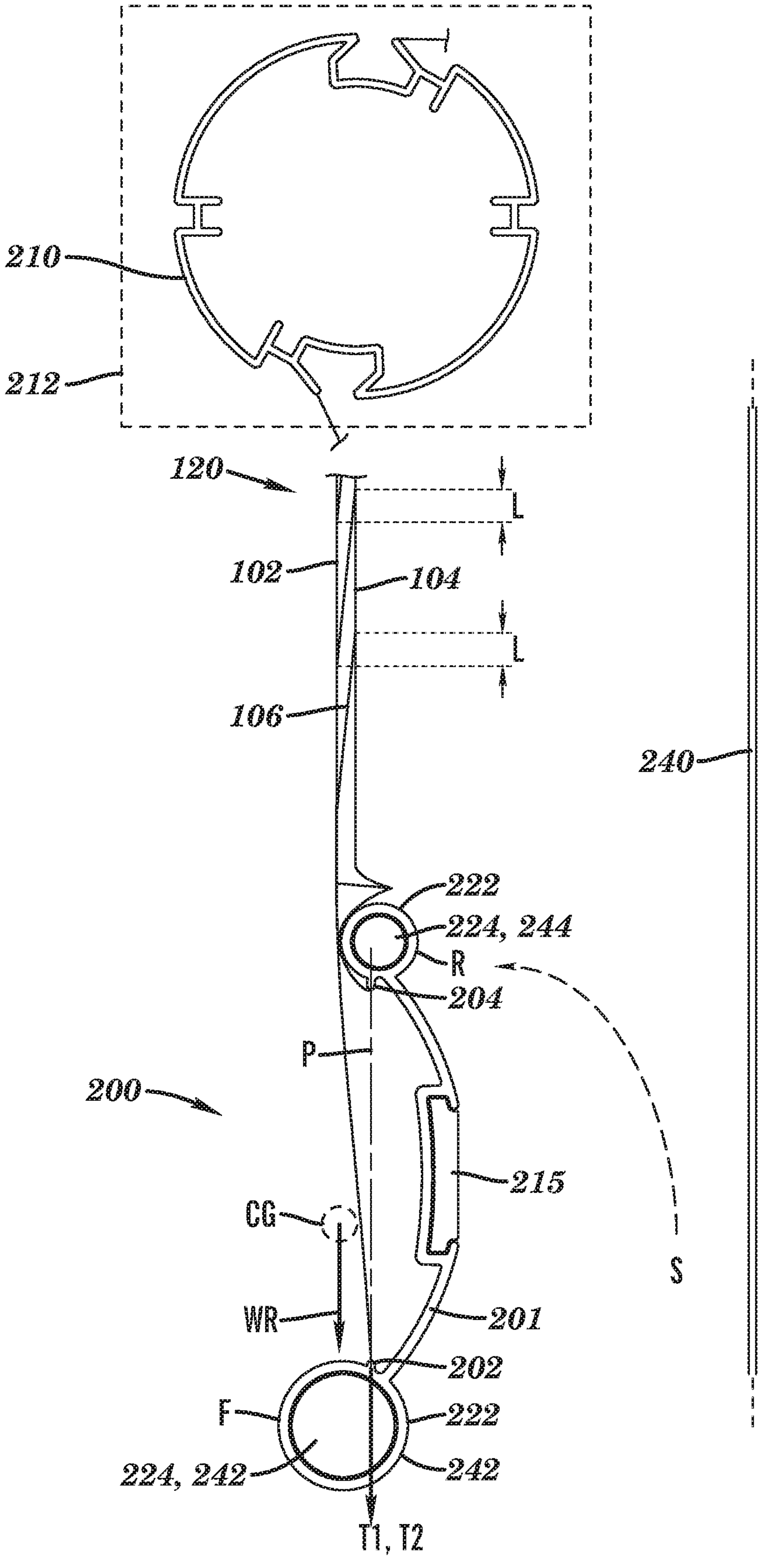
FIG. 8 shows a side view of a window shading and bottom rail in a closed position, according to further embodiments of the present disclosure.
Figure 9:
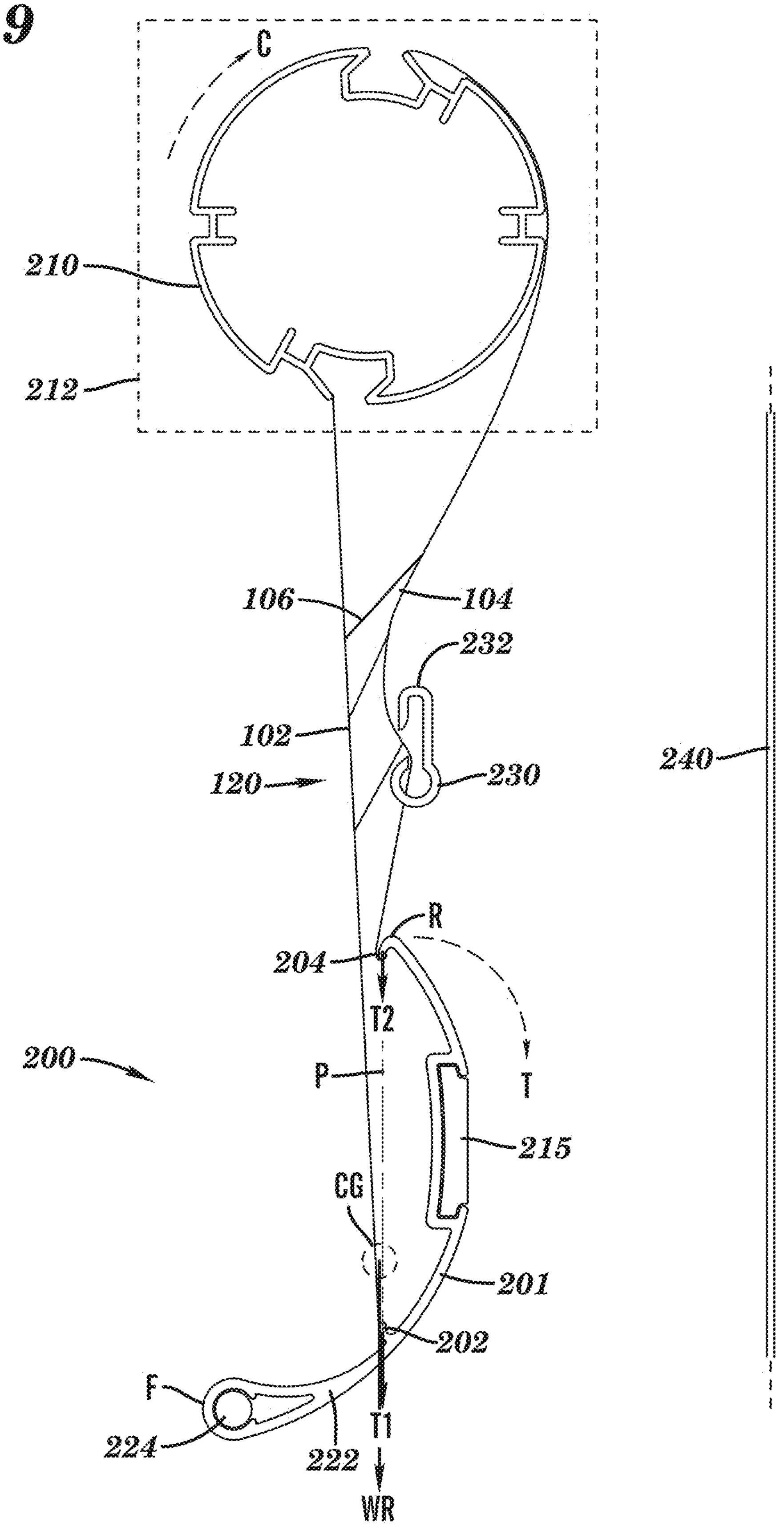
FIG. 9 shows a side view of the bottom rail in an initial opening position, according to embodiments of the present disclosure.

FIGS. 8 and 9 show side views of window shading assemblies 120 including a bottom rail 200 in a closed position, and including alternative sets of subcomponents for further customization of weight distribution, deployment setting, and/or aesthetic preference. In these embodiments, body 201 of bottom rail 200 may optionally include one or more distinct mechanical elements while otherwise functioning similarly or identically to other embodiments of bottom rail 200.

Referring to FIG. 8, body 201 may include a first weight 242 located at or near first connection point 202 of bottom rail 200. First weight 242 may be mounted on or otherwise coupled to body 201 and/or first connection point 202 in such an example. Body 201 additionally or alternatively may include a second weight 244 located near rear location R of body 201 of bottom rail 200. In such an example, second weight 244 may be mounted on or otherwise coupled to body 201 and/or second connection point 204. First and second weights 242, 244 may include coupling component (s) 222 to couple them to body 201 and to customize the weight distribution of body 201. Coupling component(s) 222 may have alternative shapes and/or sizes to assist in holding weight(s) 224 and/or customizing the weight distribution themselves. As shown in FIG. 8, in the closed position, plane P through first connection point 202 and second connection point 204 may remain located between center of gravity CO and body 201, but due to the different weight distribution, may be shifted slightly closer to first panel 102 and first connection point 202 compared to FIG. 7. Thus, embodiments of body 201 with different weight(s), e.g., first weight 242 and/or second weight 244, may be customized to operate in a slightly different manner than that of FIG. 7. For example, the FIGS. 7 and 8 embodiments may vary by amount of force needed to necessary to initiate movement from the closed to open position. The FIGS. 7 and 8 embodiments also may vary by their rotational point at which the equilibrium of bottom rail 200 is sufficiently altered to initiate and/or continue the movement from the closed to open position, and vice versa, from the open to closed position.

Referring to FIG. 9, bottom rail 200 of window shading 120 may optionally include other components for assisting in adjusting the position and/or orientation of vane(s) 106 relative to panels 102, 104. For instance, an initiator weight 230 (shown in FIGS. 4 and 7 also) may be coupled to second panel 104 in a position where initiator weight 230 may be visually obscured or concealed by vane(s) 106, or optionally, first and/or second panels 102, 104, i.e., when viewed from in front of window shading 120. Initiator weight 230 may include a coupling component 232 for mounting initiator weight 230 on second panel 104 at a fixed location. In cases where the orientation of bottom rail 200 is horizontally reversed, initiator weight 230 may be coupled to first panel 102 instead of second panel 104. In the open position shown in FIG. 4, initiator weight 230 may exert additional downward tension TC on second panel 104. Initiator weight 230 may be coupled to roller(s) 210 through second panel 104. As noted, embodiments of the disclosure allow a user of window shading 120 and bottom rail 200 to re-open window shading 120 and bottom rail 200 through interaction with roller(s) 210.

With respect to the alternative embodiment of FIG. 9, movement of initiator weight 230 downwardly or away from first panel 102 while window shading 120 is closed causes second connection point 204 to resume exerting second downward tensile force T2 on second panel 104, moving the assembly towards the open position. Clockwise movement of roller(s) 210 may cause initiator weight 230 to selectively rotate (i.e., move downward and/or in a direction away from first panel 102) second connection point 204 of bottom rail 200 about first connection point 202 to move bottom rail 200 and window shading 120 from the closed to open position. More particularly, this movement of initiator weight 230 causes bottom rail 200 to enter an "initial opening position," shown in FIG. 9, for returning bottom rail 200 and window shading 120 to the open position. Bottom rail 200 being in the initial opening position will cause center of gravity CG of bottom rail 200 to move to a position between first panel 102 and second panel 104, due to the mechanical coupling between bottom rail 200 and initiator weight 230 through second panel 104. The shifting of center of gravity CG of bottom rail 200 causes second connection point 204 to rotate (see arrow T) with respect to first connection point 202. This rotation, in turn, moves bottom rail 200 out of mechanical equilibrium, and causing bottom rail 200 to rotate back to a position in which window shading 120 is in an open position, e.g., as shown in FIG. 4. Center of gravity CG will end up vertically above plane P.

In alternative embodiments, other mechanical couplings and/or components of window shading 120, e.g., weights 224, may alternatively shift center of gravity CG to move toward second panel 104 to create rotation T with respect to first connection point 202 at different positions of second panel 104 and/or bottom rail 200. In any case, roller(s) 210 may cause bottom rail 200 to move window shading 120 into an open position without a user contacting or otherwise directly adjusting bottom rail 200.

Returning to FIGS. 4 and 7, embodiments of the disclosure provide methods to operate window shading 120, in addition to the various components of window shading 120 and bottom rail 200 described herein. As shown in FIG. 4, an example method according to the disclosure includes, e.g., initially applying of downward tensile forces to first panel 102 and second panel 104 through bottom rail 200 of window shading 120. As discussed herein, first connection point 202 of body 201 may be coupled to first panel 102 and second connection point 204 may be coupled to second panel 104, thereby causing each connection point 202, 204 to exert a respective downward tensile force T1, T2. In some cases, embodiments of the disclosure may also include coupling one or more of weights 224 to body 201 of bottom rail 200, e.g., before adjusting roller(s) 210. Weights 224 may be coupled, for example, at or near respective connection point(s) 202, 204 of bottom rail 200. The coupling of weights 224 to bottom rail 200 may allow a user to control, among other things, the position of center of gravity CG for different window shading 120 configurations, and/or to vary the magnitude of downward tensile forces T1, T2. In one non-limiting example, shown in FIG. 7, weight 224 is coupled forward of first connection point 202 and second connection point 204 of body 201, i.e., to shift center of gravity CG closer to first connection point 202.

Referring again to FIG. 7, methods according to the disclosure include adjusting roller(s) 210 to rotate second connection point 204 of bottom rail 200 with respect to first connection point 202, thereby vertically displacing second panel 104 with respect to first panel 102. As shown, center of gravity CG may move to a position outside (e.g., in front of) first and second panels 102, 104. At this point, second connection point 204 may cease exerting downward tension (T2) on second panel 104 of window shading 120. Actuating roller(s) 210 as shown in FIG. 7 thus may cause window shading 120 to move to the closed position, causing vanes 106 to move vertically and contact or overlap with each other as described herein.

Methods to operate window shading 120 according to the disclosure may include re-opening window shading 120 with the aid of initiator weight 230, as described relative to FIG. 9. According to one example, a user may actuate initiator weight 230 in a direction horizontally away from first panel 102. In this case, as shown in FIG. 4, the movement of initiator weight 230 will move center of gravity CG back to a position between first panel 102 and second panel 104, and vertically above plane P. This action may cause second connection point 204 to rotate (arrow T, FIG. 9), which returns bottom rail 200 to a position in which window shading 120 is in the open position. Thus, a user may actuate initiator weight 230 to return window shading 120 to its open position.

Embodiments of the disclosure may be implemented using a variety of alternative embodiments and implementations. For instance, bottom rail 200 may be provided as external hardware for use with pre-existing window shading assemblies 120, as a component of window shading 120 with an associated bottom rail 200, and/or any conceivable mechanical device and/or system for providing the structural or operational features discussed herein. However provided, embodiments of the disclosure can provide a safe, convenient, actuation system for window shades, as discussed herein and shown in any of the accompanying FIGS. 3-9.

Advantages of the embodiments described herein include low manufacturing costs comparable with or even less than alternative devices for adjusting double panel window shading assemblies. Further advantages of the disclosure may include: a simple installation or removal process, an unobtrusive appearance, reliable use over long periods, and the prevention of gaps between adjacent vanes, regardless of their composition. Embodiments of the present disclosure provide a safe and convenient actuation system for window shading assemblies. Embodiments of the disclosure also may facilitate and thereby improve opening and closing of the shading, by way of pulling the vanes into an open configuration or removing weight from the vanes when in a closed position. These and other operational features in embodiments of the disclosure provide a more complete closure than conventional window shading assemblies. The system described herein has preferable aesthetics due the optional initiator weights being visually obscured or concealed by coupling components 222 and/or one or more panels of window shading 120.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Approximating language, as used herein throughout the specification and claims, may be applied to modify any quantitative representation that could permissibly vary without resulting in a change in the basic function to which it is related. Accordingly, a value modified by a term or terms, such as “about,” “approximately” and “substantially,” are not to be limited to the precise value specified.

The terminology used herein is for the purpose of describing particular embodiments only and is not intended to be limiting of the disclosure. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

We claim:

1. A double panel window shading having opposing first and second panels coupled by a plurality of vanes, and a bottom rail, said double panel window shading comprising:

a body of the bottom rail;

a first connection point on the body coupled to the first panel;

a second connection point on the body coupled to the second panel, wherein a weight distribution of said body causes a center of gravity of said bottom rail to be closer to said first connection point than said second connection point, and wherein said bottom rail is adjustable between:

an open position in which the plurality of vanes are substantially horizontal between the opposing first and second panels, and: said first connection point exerts a first downward tensile force on the first panel, said second connection point exerts a second downward tensile force on said second panel, and the center of gravity of said bottom rail is horizontally between opposing first and second panels, and a closed position in which the plurality of vanes have a substantially vertical orientation between the opposing first and second panels, and: said first connection point exerts the first downward tensile force and the second downward tensile force on the first panel, and said second connection point does not exert the second downward tensile force on the second panel; and an initiator weight operatively coupled to the second panel of the double panel window shading through a coupling component, and operatively coupled to the body through the second panel, wherein said operative coupling is configured for said initiator weight to selectively rotate said second connection point of said bottom rail about said first connection point to move said bottom rail from the closed position to the open position.

2. The double panel window shading of claim 1, wherein the initiator weight is vertically displaced from the body of the bottom rail along a length of the second panel.

3. The double panel window shading of claim 1, wherein said initiator weight is operably coupled to a roller of the double panel window shading through the second panel, and said roller is configured to vertically displace the second panel relative to the first panel.

4. The double panel window shading of claim 1, wherein at least one of the plurality of vanes visually obscures a position of said initiator weight in the closed position.

5. The double panel window shading of claim 1, wherein said coupling component of the initiator weight includes a clip for mounting the initiator weight on the second panel in a fixed position.

6. The double panel window shading of claim 1, further comprising at least one weight coupled to said body.

7. The double panel window shading of claim 6, wherein said body of said bottom rail includes one or more body coupling components to couple at least one weight to said body.

8. The double panel window shading of claim 1, wherein the weight distribution of said body causes the center of gravity of said bottom rail to be on a side of a plane through said first connection point and said second connection point opposing said body.

9. The double panel window shading of claim 1, wherein said bottom rail in the closed position locates the first panel between said body and said center of gravity of said bottom rail.

10. A double panel window shading assembly having opposing first and second panels coupled by a plurality of vanes and operably associated with a roller, and a bottom rail, said assembly comprising:

a bottom rail including:

a body, a first connection point on the body coupled to the first panel, a second connection point on the body coupled to the second panel, wherein a weight distribution of said body causes a center of gravity of said bottom rail to be on a side of a plane through said first connection point and said second connection point opposing the body; and an initiator weight operatively coupled to the second panel of the double panel window shading through a coupling component and operatively coupled to the body through the second panel;

wherein said assembly is adjustable between:

an open position in which the plurality of vanes be substantially horizontal between the opposing first and second panels, and: said first connection point exerts a first downward tensile force on the first panel, said second connection point exerts a second downward tensile force on said second panel, and said center of gravity of said bottom rail is horizontally between the opposing first and second panels, and a closed position in which the plurality of vanes have a substantially vertical orientation between the opposing first and second panels, and: said first connection point exerts the first and second downward tensile forces on the first panel, and said second connection point does not exert the second downward tensile force on the second panel; and an initial opening position in which said first connection point exerts the first downward tensile force on the first panel, and said initiator weight exerts a tensile force on the second panel such that said second connection point selectively rotates said second connection point of said bottom rail about the first connection point of said body to move said bottom rail from the closed position to the open position.

11. The assembly of claim 10, wherein said roller is configured to vertically displace the second panel relative to the first panel.

12. The assembly of claim 10, wherein said body, said first connection point, and said second connection point of said bottom rail comprise a unitary structure.

13. The assembly of claim 10, wherein said body includes at least one weight coupled thereto.

* * * * *